US005269001A

United States Patent [19]

Guttag

[11] Patent Number: 5,269,001

[45] Date of Patent: Dec. 7, 1993

[54] VIDEO GRAPHICS DISPLAY MEMORY SWIZZLE LOGIC CIRCUIT AND METHOD

[75] Inventor: Karl M. Guttag, Missouri City, Tex.

[73] Assignee: Texas Instruments Incorporated, Dallas, Tex.

[21] Appl. No.: 898,398

[22] Filed: Jun. 11, 1992

Related U.S. Application Data

[63] Continuation of Ser. No. 830,793, Feb. 3, 1992, abandoned, which is a continuation of Ser. No. 387,567, Jul. 28, 1989.

[51] Int. Cl.$^5$ ........................ G06F 12/02; G09G 1/02

[52] U.S. Cl. .................................... 395/165; 395/164; 345/202

[58] Field of Search ................ 395/165, 164; 340/798, 340/799, 803, 802; 365/189.02, 189.08, 230.01, 230.03

[56] References Cited

U.S. PATENT DOCUMENTS

| | | | |
|---|---|---|---|
| 4,807,189 | 2/1989 | Pinkham et al. | 365/189 |
| 4,823,286 | 4/1989 | Lumelsky et al. | 364/521 |
| 4,845,640 | 7/1989 | Ballard et al. | 364/518 |
| 4,945,495 | 7/1990 | Ueda | 364/518 |
| 4,958,303 | 9/1990 | Assarpour et al. | 364/521 |
| 4,965,751 | 10/1990 | Thayer et al. | 364/521 |
| 4,975,880 | 12/1990 | Knierim et al. | 365/189.02 |

FOREIGN PATENT DOCUMENTS

| | | |
|---|---|---|
| 0071744 | 2/1983 | European Pat. Off. . |
| 88/07235 | 9/1988 | PCT Int'l Appl. . |

OTHER PUBLICATIONS

K. Takuji, "Picture Enlarging Device", Matsushita Electric Ind. Co., Ltd., Patent Abstract of Japan, Sep. 5, 1988, Application No. JP860251124.

*Primary Examiner*—Gary V. Harkcom
*Assistant Examiner*—Raymond J. Bayerl
*Attorney, Agent, or Firm*—Robert D. Marshall, Jr.; Richard L. Donaldson; James C. Kesterson

[57] ABSTRACT

A circuit and method of operation which controls the reordering of data as it is transferred from one memory to another. The data to be reordered is stored in a memory such that the ordinate bit position within a data word is uniquely associated with a particular input to a data bus. The bus inputs, however, are connected to the VRAM in an arrangement contrary to the desired ordinate association with the compressed data word. A swizzle logic circuit operates to allow graphic compressed data to be reordered for presentation to the block-write inputs of a VRAM.

24 Claims, 7 Drawing Sheets

*FIG. 6*

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 7 | 7 | 7 | 7 | 6 | 6 | 6 | 6 | 5 | 5 | 5 | 5 | 4 | 4 | 4 | 4 | 3 | 3 | 3 | 3 | 2 | 2 | 2 | 2 | 1 | 1 | 1 | 1 | 0 | 0 | 0 | 0 |

SWIZZLE CORESPONDENCE

| INPUT | OUTPUT |
|---|---|
| 0 | 0 |
| 1 | 4 |
| 2 | 8 |
| 3 | 12 |
| 4 | 16 |
| 5 | 20 |
| 6 | 24 |
| 7 | 28 |
| 8 | 1 |
| 9 | 5 |
| 10 | 9 |
| 11 | 13 |
| 12 | 17 |
| 13 | 21 |
| 14 | 25 |
| 15 | 29 |
| 16 | 2 |
| 17 | 6 |
| 18 | 10 |
| 19 | 14 |
| 20 | 18 |
| 21 | 22 |
| 22 | 26 |
| 23 | 30 |
| 24 | 3 |
| 25 | 7 |
| 26 | 11 |
| 27 | 15 |
| 28 | 19 |
| 29 | 23 |
| 30 | 27 |
| 31 | 31 |

*FIG. 7*

VIDEO GRAPHICS DISPLAY MEMORY SWIZZLE LOGIC CIRCUIT AND METHOD

This application is a Continuation of application Ser. No. 07/830,793, filed Feb. 3, 1991, now abandoned, which is a continuation of application Ser. No. 07/387,567, filed Jul. 28, 1989, now abandoned.

TECHNICAL FIELD OF THE INVENTION

This invention relates to block-write graphic control data memory write systems and more particularly to an arrangement which allows for the economical reordering of data prior to controlling the block-write function.

CROSS REFERENCE TO RELATED APPLICATIONS

All of the following patent applications are cross-referenced to one another, and all have been assigned to Texas Instruments Incorporated. These applications have been concurrently filed and are hereby incorporated in this patent application by reference.

| Ser. No. | Title |
|---|---|
| 07/387,568 | Video Graphics Display Memory Swizzle Logic and Expansion Circuit and Method |
| 07/898,398 | Video Graphics Display Memory Swizzle Logic Circuit and Method |
| 07/387,459 | Graphics Floating Point Coprocessor Having Matrix Capabilities, now U.S. Pat. No. 5,025,407 |
| 07/939,957 | Graphics Processor Trapezoidal Fill Instruction Method and Apparatus |
| 08/009,429 | Graphic Processor Three-Operand Pixel Transfer Method and Apparatus |
| 07/783,727 | Graphics Processor Plane Mask Mode Method and Apparatus, now abandoned |
| 07/386,936 | Dynamically Adaptable Memory Controller For Various Size Memories |
| 07/387,472 | Graphics Processor Having a Floating Point Coprocessor, now abandoned |
| 07/387,553 | Register Write Bit Protection Apparatus and Method, now U.S. Pat. No. 5,161,122 |
| 07/387,569 | Graphics Display Split-Serial Register System, now abandoned |
| 07/387,455 | Multiprocessing Multiple Priority Bus Request Apparatus and Method, now abandoned |
| 07/387,325 | Processing System Using Dynamic Selection of Big and Little Endian Coding, now abandoned |
| 07/735,203 | Graphics Processor Nonconfined Address Calculation System |
| 07/386,850 | Real Time and Slow Memory Access Mixed Bus Usage, now abandoned |
| 07/387,479 | Graphics Coprocessor Having Imaging Capability now abandoned |
| 07/387,255 | Graphics Floating Point Coprocessor Having Stand-Alone Graphics Capability, now abandoned |
| 07/713,543 | Graphics Floating Point Coprocessor Having Vector Mathematics Capability, now abandoned |
| 07/386,849 | Improvements in or Relating to Read-Only Memory, now U.S. Pat. No. 5,079,742 |
| 07/386,266 | Method and Apparatus for Indicating When a Total in a Counter Reaches a Given Number |

BACKGROUND OF THE INVENTION

Microprocessors intended for graphics applications must be able to move pixel information between memory bit maps as quickly as possible. In situations where many pixels must be transferred to a bit map, the transfer may be speeded up by using a block-write feature. Typically, a block-write is created by associating a color register with each VRAM, filling the color register with bits to determine the desired color value of selected portions of the VRAM, and then using both the address bits of the VRAM as well as the data bus input to the VRAM to determine the locations within the VRAM where the color represented by the value in the color register will appear. This technique does not burden the data bus with multiple copies of the same pixel value and thus increases the available memory bandwidth, again speeding up data transfers.

The simplest application where the block-write can be used to advantage is the fill, which transfers the same pixel value into a defined area of memory. Also, some forms of data expansion are well suited to the application of block-write techniques. Thus, when a bit map is stored in compressed form the 1's and 0's can represent the presence or absence of a pixel and block-writes can be used to decompress the bit map. Typically, this sort of expansion is applied to character fonts which are often stored in compressed form to save memory.

Problems arise because memory accesses must be made in regular mode and in block-write mode via the same bus and they must be consistent such that data written (or read) in one mode must be able to be read (or written) in the other mode. This is a problem, since before data can be written to VRAMs in block-write mode, the bit order of the compressed representation of the data must be manipulated or swizzled relative to the regular mode access. This bit order change is necessary because typically the compressed data is stored with one bit representing each multibit display pixel in a specific order. The storage of these bits is serial with each bit representing a corresponding display point. For example, the first bit (bit 0) would represent pixel position one. The second bit (bit 1) would represent pixel position two and the third bit (bit 2) would represent pixel position three. Thus, the bits on the bus, in this example would represent the pixel positions one for one, such that bus bit position zero would contain data for the first pixel, while bus position three would contain data for the fourth pixel. However, because of the physical arrangement of the VRAMs where successive pixels are stored in different VRAM chips (or Units), the data must be reordered before presentation to the VRAMS. Consider the case where the VRAMS are four bits wide (four planes) with a 32 bit wide data bus. The data bus would have bus positions 0–3 connected to the first VRAM which in turn can control bits 0–3 of the first pixel in a normal write situation. Without swizzling, the compressed data in bus bit position 1 (the second position) which should be destined to control the second pixel will end up being communicated to the second input of the first VRAM, which with a normal access be associated with the ninth pixel and not the required second pixel Thus, a bit order rearrangement is necessary when functioning in the block-write mode.

A further problem is encountered since the nature of a data swizzle depends on the size of the pixel. Several different swizzles must be made to accommodate a broad range of pixel sizes and VRAM configurations. Thus, it is fair to say that the block-write mode of the video RAMs can only be reasonably used for filling areas in exact multiples of the block size The nature of the VRAM's block-write function results in a scrambled writing to the pixels within a block unless some data reordering is accomplished.

Accordingly, a need exists in the art for a swizzle arrangement which allows for the efficient manipulation of data so as to accomplish block-writes in an economical manner.

A further need exists in the art for swizzle logic which can be used for any size pixel or VRAM configuration.

A further need exists in the art to design a system using the block write mode that can correctly and efficiently control the writing down to each pixel within the block as well. Further, there is a need for such a system that can be applied for different numbers of color planes.

SUMMARY OF THE INVENTION

There is designed a swizzle arrangement which can be utilized for many different size pixels. This circuit takes advantage of the recognition that the need for swizzling occurs because during a block-write access the bits of the data stream directed at the VRAMS are accessing different pixel locations than they would be under normal write conditions if not swizzled. This difference can be thought of as a reordering in the bit stream caused by the fact, as discussed above, that each VRAM handles one pixel (or a part of one pixel) with the pixel having four (or more) bits.

Assuming that each pixel has four bits, and assuming that each VRAM has four data input paths (one for each bit of the pixel), there would be a separation, or reordering, of four bit positions between the compressed data and the actual input to the VRAMs. This reordering is performed by a swizzle circuit.

Thus compressed bus bit 0 goes to post swizzle position 0, while bus bit 1 goes to post swizzle position 4. Likewise, compressed bus bit 2 goes to post swizzle position 8 and compressed bus bit 3 goes to post swizzle position 12. This continues for 7 compressed bit positions with compressed bit 7 going to post swizzle position 28. The next compressed bit, bit 8, goes to post-swizzle position 1, while compressed bit 9 goes to post-swizzle position 5. This discontinuous sequence continues for the full bus width.

In the situation where the pixel size is 8 bits, two four bit wide VRAMs would be required, each holding one-half of the eight bit pixel. In this situation, then, the expansion requires a different algorithm, namely the reordering of the ordinate position of the compressed bits by 8 positions. It is recognized that all VRAMs comprising the same pixel must be provided the same identical control signal. Thus, for a 2 VRAM pixel (for example, 8 bits) two positions of the bus must reflect the same compressed bit value.

There are two options for performing the swizzle. One is to create a larger, i.e. 64 lead, bus. This requires additional or larger VRAMs and more circuitry for controlling the bus. The other option is to have a different swizzle pattern in the swizzle circuit. In both cases the compressed data must control more than one VRAM if the pixel is contained in more than one VRAM.

The memory addressing must be adjusted to correspond to the larger amount of data being written to the VRAM when performing a series of block-write accesses data bits going to a VRAM are expanded internally by a factor of 4 in the block-write mode. Thus a 32-bit data bus is expanded to 128 bits inside the VRAMs in block-write mode. Therefore, to efficiently step from one addressable location to the next adjacent one requires that the address be incremented/decremented (depending on direction) by 128 (in terms of the bit address) rather than 32 as would be done in regular addressing.

The swizzle operation in one embodiment could be realized by the proper connection of a multiplexer function for each given bit position. The multiplexing would select between the normal (or straight pass) mode and one or more swizzle functions as needed.

It is a technical advantage of this invention to provide a mechanism for writing pixels to a memory array both in normal mode as well as block write mode in a consistent manner.

BRIEF DESCRIPTION OF THE DRAWINGS

For a more complete understanding of the present invention and further advantages thereof, reference is now made to the following Detailed Description, taken in conjunction with the accompanying Drawings, in which:

FIG. 6 shows a four position expansion;

FIG. 7 shows the swizzle circuit cross-connections for all situations;

DETAILED DESCRIPTION OF THE INVENTION

Figure 1:
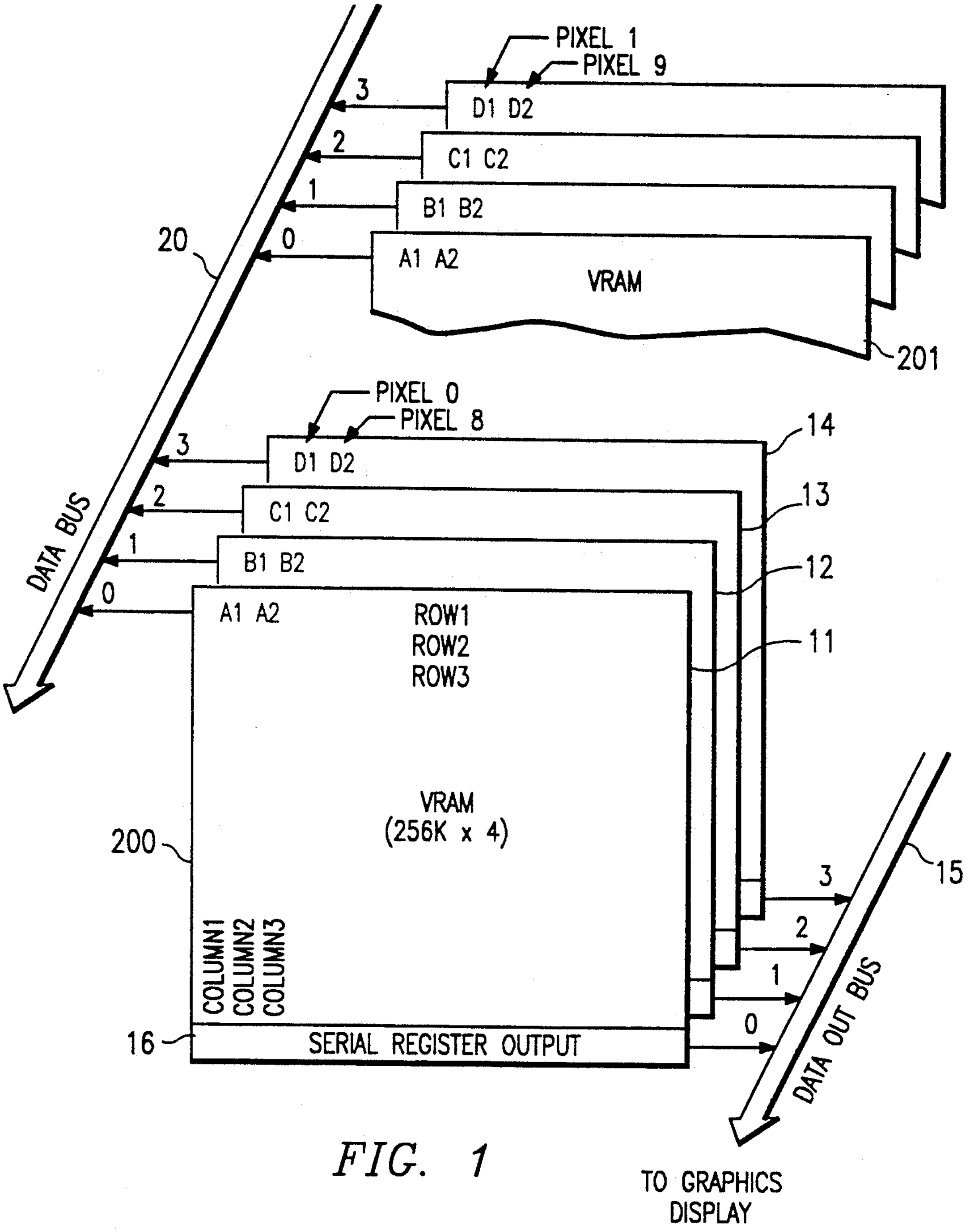
FIG. 1 shows a stylized view of a VRAM memory.

Turning now to FIG. 1, a brief discussion of the memory structure of a typical graphics memory system is in order before progressing to the actual detailed description of the functioning of the embodiment of this invention. While there are many memory structures and systems which could be used, in the preferred embodiment it is typical to use a structure such as shown in FIG. 1 which uses eight VRAM memories 200, 201, etc. in an array. Each VRAM memory or unit has a 4 bit data port which can be treated as having planes 11, 12, 13 and 14. The construction of each plane is such that a single data lead is used to write information to that plane. These leads are labeled 0, 1, 2, and 3 for each plane. In a system that uses a 32 bit data bus, such as data bus 20, there would be 8 VRAM memories (two of which are shown in FIG. 1) each memory having four data leads connected to the data bus.

Figure 2:
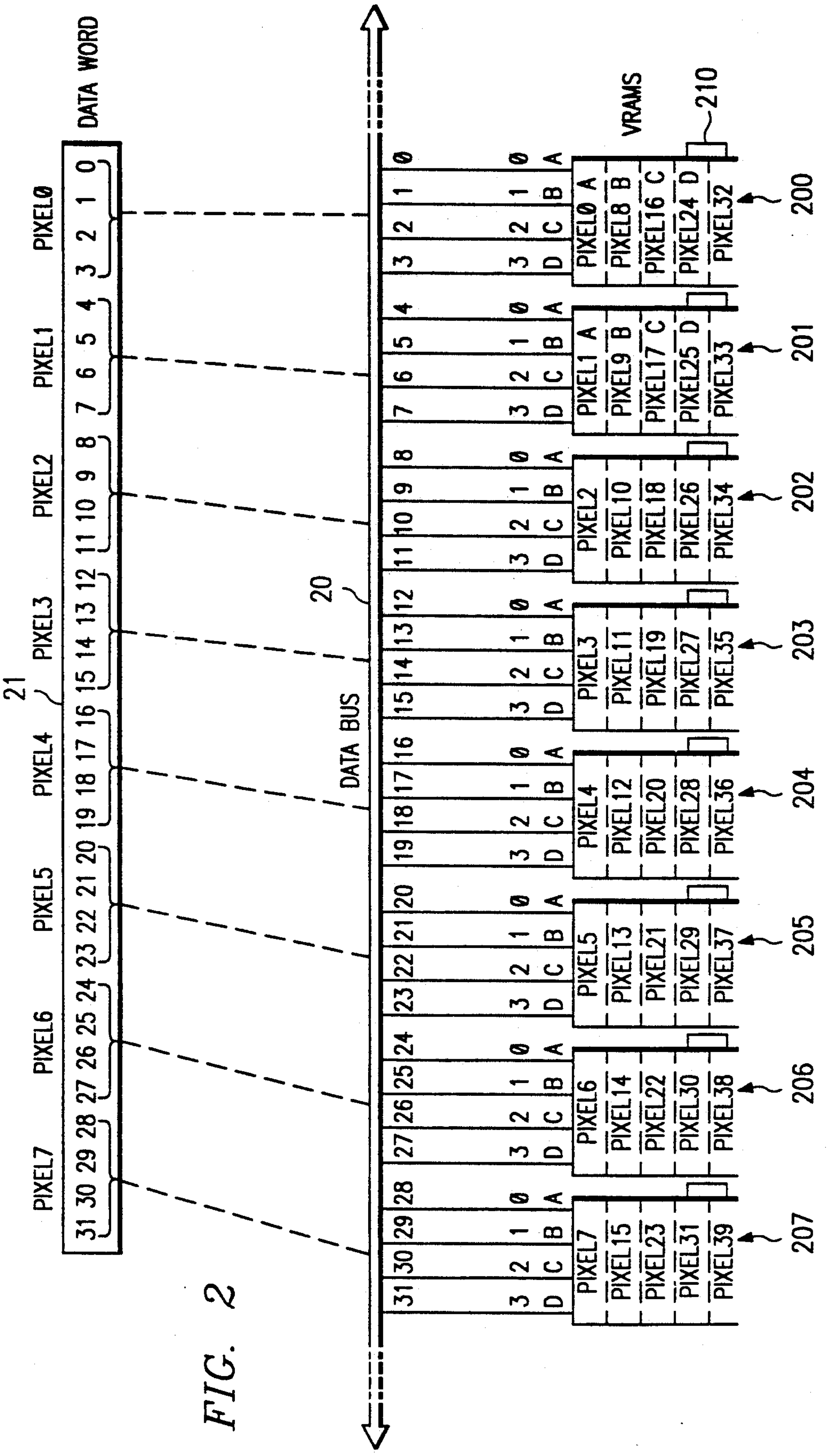
FIG. 2 shows a VRAM memory connection to a data bus.

Thus, for a 32 bit data bus VRAM memory 200 would have its four data leads connected to data bus leads 0, 1, 2, 3, respectively. Likewise, VRAM memory 201 would have its four leads 0, 1, 2, 3 connected to data bus leads 4, 5, 6, 7, respectively. This continues for the remaining six VRAM's such that the last VRAM has its leads connected to leads 28, 29, 30, 31 of bus 20. The full set of connections is shown in FIG. 2.

Continuing with FIG. 1, the memories are arranged such that the pixel information for the graphics display is stored serially across the planes in the same row. Assuming a four bit per pixel system, then successive pixels are stored in successive VRAMs. In such a situation pixel 0 would be in VRAM 200, and pixel 1 would be in VRAM 201 The pixel storage for pixels 2 through 7 are not shown in FIG. 1 but are shown in FIG. 2. The pixel information for pixel 8 then would be stored in VRAM 200, still in row 1 but in column 2 thereof. The reason for this arrangement of pixel information will be more fully appreciated from an understanding of how information is retrieved from the memory.

Continuing with FIG. 1, each VRAM plane has a serial register 16 for shifting out information from a row of memory. The outputs from these registers are connected to data out bus 15 in the same manner as the data input leads are connected to the data input bus. Thus, data from a row of memory, say row 1, would be moved into register 16. This would occur for each plane of the eight memory array.

Looking at data output bus 15 at an instant of time, the first bit in each shift register would be on the bus. Thus assuming row 1 was being outputted to the bus, the bus would have on its lead 0 the row 1 bit Al of memory 200 Output bus 15 lead 1 would have on it row 1, bit B1; lead 2 would have row 1, bit C1; and lead 3 would have on it row 1, bit D1. These bits would be followed by memory 201 row 1 bits, A1, B1, C1, D1 on leads 4, 5, 6, 7, respectively. Thus, at a first instant of time, data out bus 15 would have on it the four bits forming pixel 0 followed by the four bits forming pixel I, followed by the four bits forming pixel 2. This would continue until the 32 bits forming the 8 pixels 0–7 were on the consecutive leads of data out bus 15. These bits would be supplied to the graphics display and the shift registers would all shift one position providing the bus with pixel information for the next 8 pixels, namely pixels 8 through 15. This shifting would then continue until the entire line was shifted out and then a new line would be selected for loading into the output register. A more complete discussion with respect to the shifting out of data from a VRAM is contained in copending concurrently filed patent application entitled GRAPHICS DISPLAY SPLIT SERIAL REGISTER SYSTEM, Ser. No. 07/387,569, now abandoned, which application is incorporated herein by reference. For a more detailed description of the operation of a VRAM and its block-write mode, see U.S. Pat. No. 4,807,189, issued Feb. 21, 1989, which patent is hereby incorporated by reference herein.

Up to this point we have assumed that the bit information per pixel is 4 bits. If the pixel information were to be, say 8 bits then two 4 bit wide VRAMs would have to be used for each pixel. This would change the bit patterns somewhat. This aspect of the invention will be discussed in further detail hereinafter. Also, it should be noted that memory sizes and structures continue to vary and the size and structure shown are only for illustrative purposes and this invention can be used with many different memory configurations and with different pixel sizes.

It must be noted that the depiction of memory in FIGS. 2 through 5 is a one-dimensional representation of what is conceptually a three-dimensional array as shown in FIG. 1. Therefore, from this point on the term "row" refers to the set of pixels addressed at any one time from the bus.

Turning now to FIG. 2, a full eight VRAM arrangement is shown with the information for controlling pixels 0–7 contained in the top row of VRAMs 200 through 207, while pixels 8 through 15 are in row 2, and pixels 16 through 23 are in row 3, and pixels 24 through 31 are in row 4. This arrangement continues for each additional row of memory.

For normal write operations to the VRAM memory, bits of data are received over data bus 20. The position of the information on the bus determines where the data is to be stored in the VRAMs. Thus, a bit on lead 0 of bus 20 goes onto lead 0 of VRAM 200. Assuming the address location of the first row of VRAM 200 has also been selected, that bit information would become associated with bit 0 of pixel 0. This is the well known traditional operation of graphics systems and details of this operation will not be undertaken here. It is sufficient for our understanding of this invention to note that a given data word, such as data word 21, has bits in ordinate position and these bits will be transferred directly to the proper bit positions within the VRAMs because of the physical connections and associations between the data bus and the VRAMs. Also note that information in ordinate positions 0–3 of data word 21 can go, via bus 20, to one of many pixels 0, 8, 16, 24, 32, etc. The actual storage location will depend upon other concurrent addressing to the VRAMs, all of which is not shown here but is well known in the art.

The method of presentation of data as described above requires 32 bits of data, and a full memory write cycle for each row (8 pixels) In some situations, for example, when a background color is to be painted on a screen, many pixels will have the same information written to them. The block-write method of loading a VRAM has been devised to handle this situation. This operation, which is well known in the art, uses a special register on each VRAM, such as register 210 shown in conjunction with VRAM 200, which contains bits for transfer to selected pixel locations within memory. These bits are loaded prior to the start of any block-write operation.

During the block-write operation the memory is loaded in a manner different from normal loading. The four data input leads are used, but this time each bit controls the transfer of the special register bits to a particular memory row in that VRAM. For example, in VRAM 200 assume it is desired to load pixels 0, 8 and 24 with the bits from register 210 while leaving pixel 16 unchanged. In this situation, leads 0, 1, 3 would have logical 1's thereon while lead 2 would contain a logical 0. This same situation would prevail for the entire 32 bit bus in that the ordinate position of the bits would determine whether or not information is to be transferred into a corresponding pixel in a corresponding VRAM memory row. This, it will be appreciated, is different from the normal loading of data where the data itself comes from the data bus. For block-write operations, the data comes from the special registers associated with each VRAM and the bits on the data bus merely give on-off or load-not load control depending upon their position on the various leads of the bus.

The data word that controls this operation is then said to be in compressed format such that the ordinate position of each bit being either a 1 or 0 controls a function. Also it should be noted that 1 and 0 representing on and off, respectively, is merely illustrative and the reverse may be true also.

Figure 3:
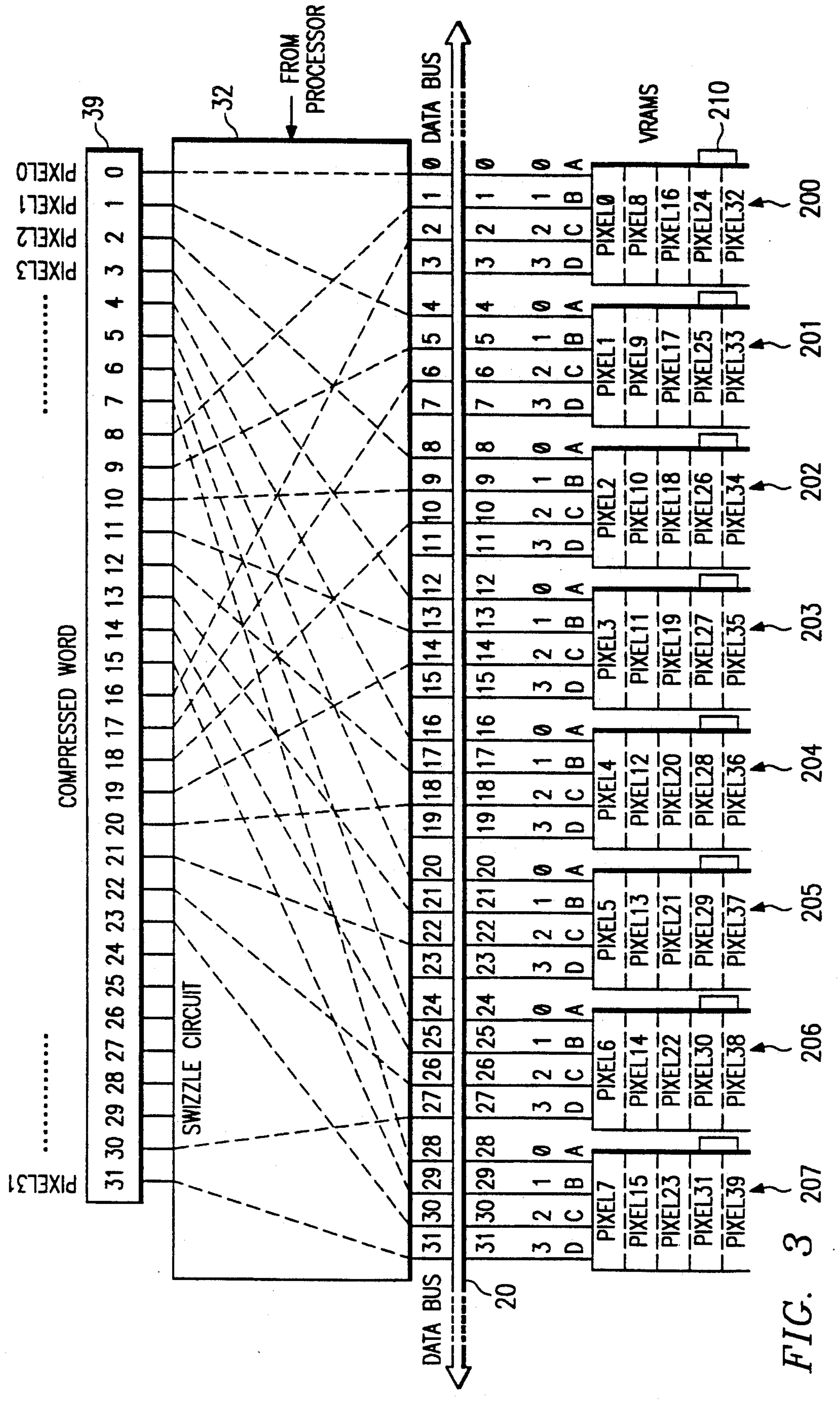
FIG. 3 shows a swizzle circuit connected to the data bus.

Turning now to FIG. 3, it will be seen that compressed data word 39 has ordinate positions 0-31 which must be presented to the VRAMs to control various pixels in accordance with the ordinate position of the data in the word. Thus, pixel 0 is to be controlled by compressed data bit 0, while pixel 1 is to be controlled by compressed data bit 1. In this manner, compressed data bit 31 should then control pixel 31. This is easier said than done.

Pixel 0 is easy since it is controlled by lead 0 of VRAM 200 which is connected to compressed bit 0.

However, the bit in position 1 of compressed data word 39 begins the problem. In FIG. 2 this non-compressed bit is connected to pin 1 of VRAM 200. However, as discussed above, the bit in compressed data ordinate position 1 is used to control the writing of information from the special register into pixel 1. Pixel I is controlled, in turn, by a 1 or 0 on lead I of VRAM 201. This lead, in turn, is connected to lead 4 of bus 20 A comparison of FIGS. 2 and 3 will show that in one situation bit position 1 of the input data word goes to lead 1 of bus 20 while in the other situation it goes to lead 4. Thus, clearly a reordering of bits is necessary when compressed words are used to control data transfer in the block-write mode.

This reordering is accomplished by swizzle circuit 32 which is interposed between the compressed data input and the actual data bus. Swizzle circuit 32 is controlled by the processor to allow data to flow straight through, as would be the situation for FIG. 2, or to reorder the leads in a certain pattern as is required for FIG. 3. This arrangement does not require processor time to rearrange information, but rather establishes a pattern based on the physical structure of the memory bus arrangement and calls upon that structure whenever a block-write operation is invoked.

The swizzle circuit could be hard wired or could be software controlled within or outside of the processor.

Now let us assume that instead of four bits per pixel it is desired to use eight bits per pixel and retain a 32-bit data bus. Also let us assume that we continue using VRAMs having four planes per unit as discussed with respect to FIG. 1 In such a situation the reordering of the bits from the compressed word would be different than it was when only four bits per pixel were used. This can easily be seen in FIG. 4 where VRAMSs 200 and 201 now both contain pixel 0 information, while VRAMs 202,203 contain pixel 1 information.

It follows then that while again compressed data bit 0 continues to be associated with lead 0 of VRAM 200, all the other ordinate positions of the compressed word are associated with different leads of the bus Take for example compressed word ordinate position 2. In FIG. 3, compressed data word ordinate position 2 is associated with pixel 2 and bus lead 8. However, in FIG. 4, the association is with bus lead 16 This then argues for separate swizzle for systems where there is different pixel configurations Also, since half of each pixel is contained in a separate VRAM, both halfs are controlled by the same compressed data control bit Thus, each compressed data control bit must be duplicated once for each additional VRAM which contains part of a given pixel. This also argues different swizzles for each pixel configuration.

Figure 4:
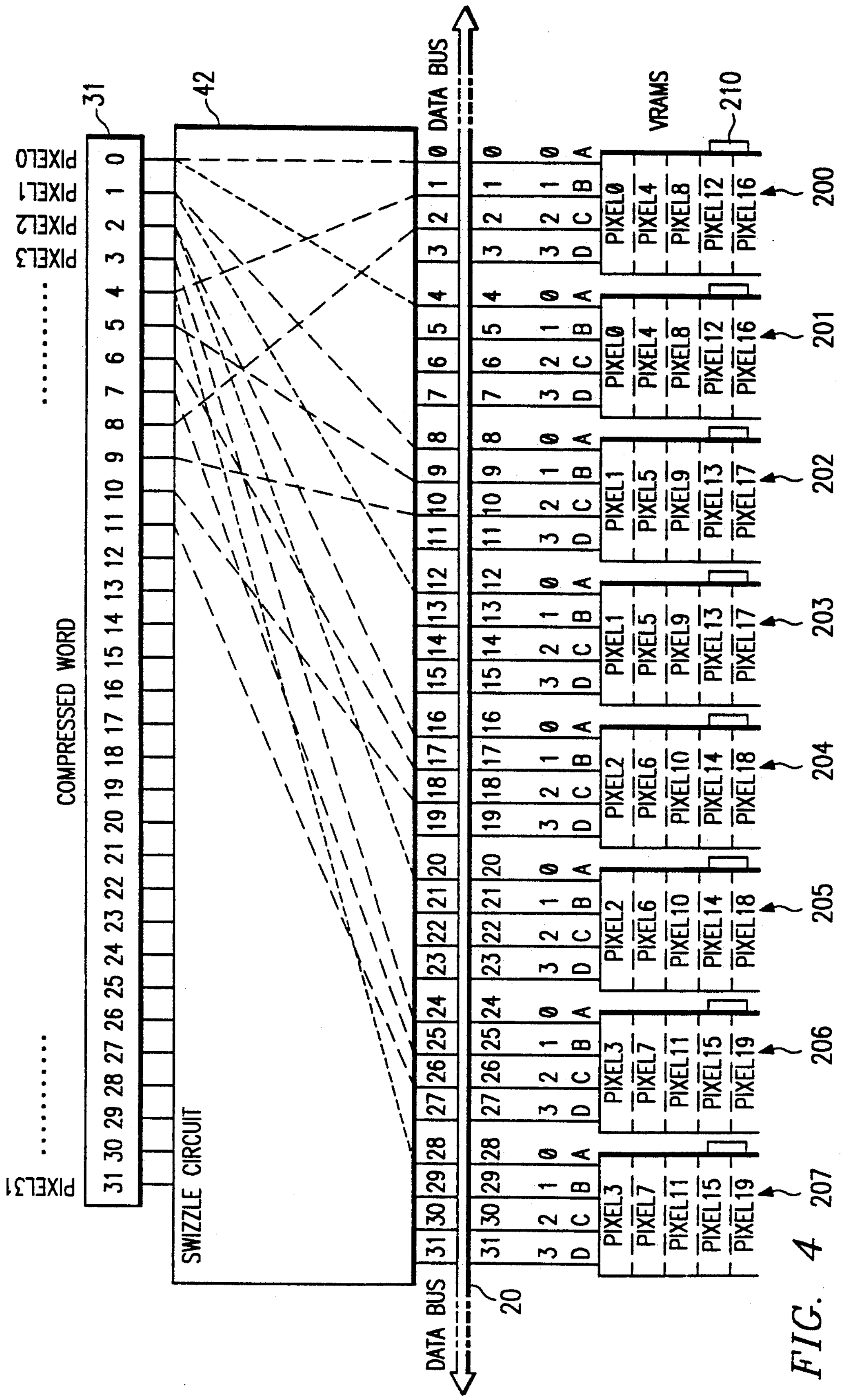
FIGS. 4 and 5 show partial connections for alternate swizzle circuits.

From FIG. 4 it is clear that because each bit of the compressed word connects to two VRAM inputs that only 16 bits of the compressed will control all of the VRAMs in a 32 bit bus configuration. The first system for solving this problem is to maintain the 32 bit bus and take two bus cycles to use both halves of the 32 bit compressed word. The other option is to use all 32 bits of the compressed word which expands the data bus to 64 bits.

Figure 9:
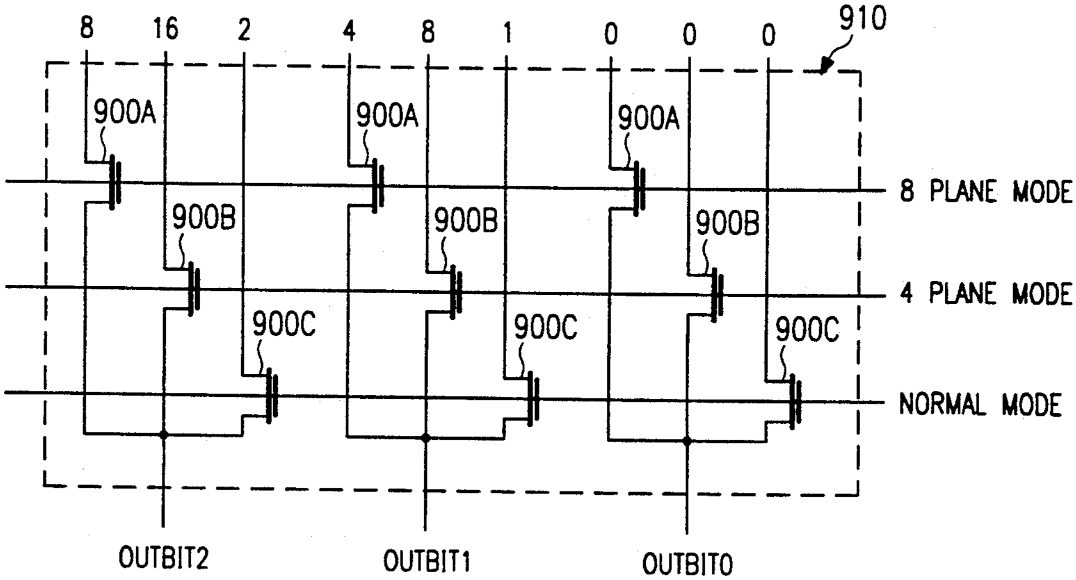
FIG. 9 shows an embodiment of a swizzle circuit used for several different memory configurations.

FIG. 9 shows a schematic diagram of how a simple multiplexer would achieve the required swizzle for output bits 0, 1, and 2 for supporting the 4 plane and 8 plane modes of the preferred embodiment. In normal mode the multiplexer function simply passes the corresponding bit position from input to output (i.e. 0 to 0, 1 to 1, and 2 to 2). For the 4 plane mode selection, the input to output connections are made as outlined in FIG. 3 (0 to 0, 8 to 1, 16 to 2). For the 8 plane selection, the connections are made as outlined in FIG. 4 (0 to 0, 4 to 1, 8 to 2). Of course, other multiplexer functions could be made to support other numbers of planes and different bus organizations.

While in the preferred embodiment, the swizzle function is performed by multiplexer hardware function, other means such as a software based table lookup method could be used to perform the swizzle.

Figure 5:
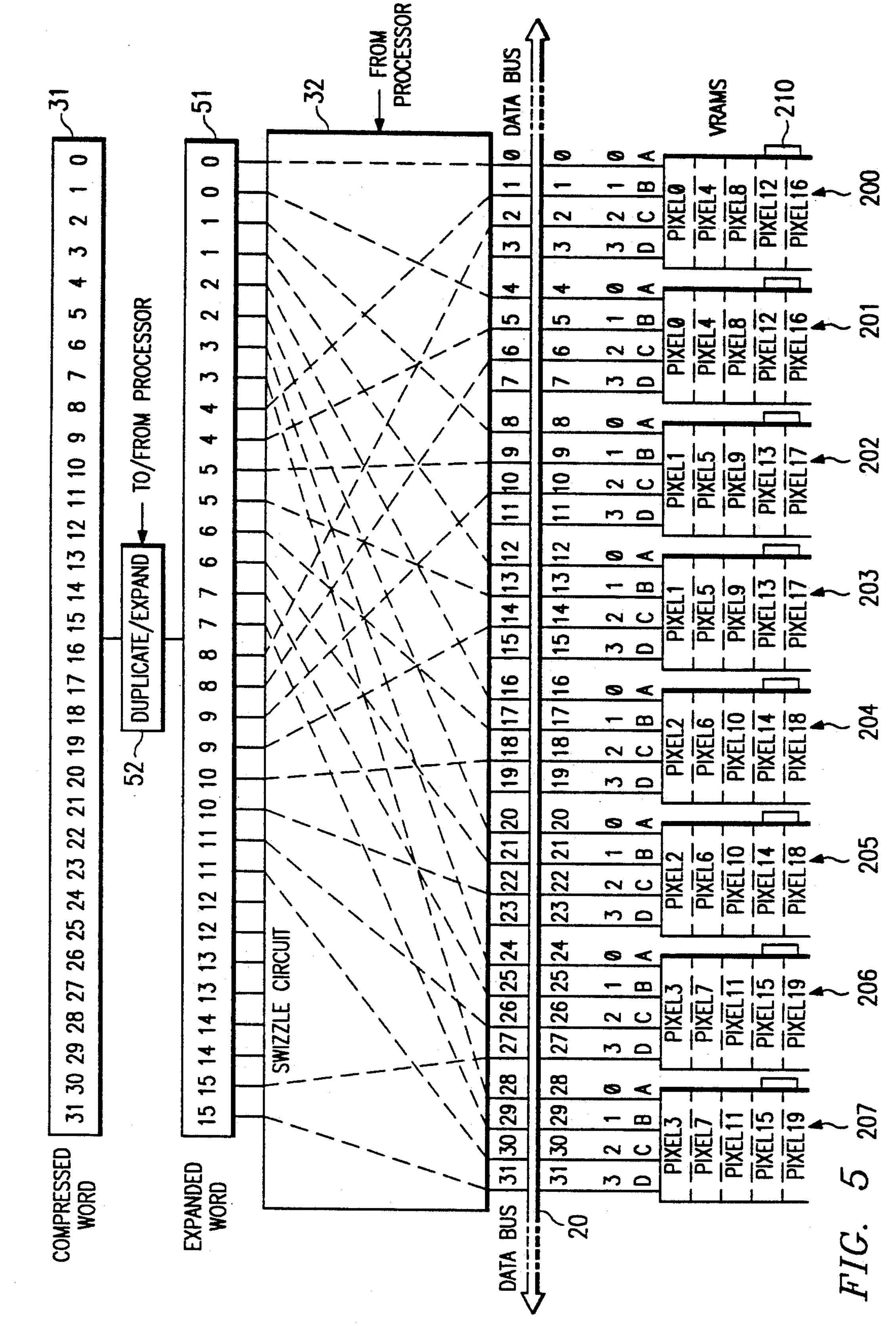

Turning to FIG. 5, it is seen that expanding the compressed word by duplicating each bit corresponding to the number of VRAMs used per pixel will result in the ability to use the same swizzle circuit for different memory/pixel configurations. This solution, as performed by duplicating/expansion circuit 52 has the effect of also activating both VRAMs of a given pixel, since the color information must be provided to all pixel bits even when these bits are positioned within two VRAMS.

The essence of the operation is the fact that the duplication and expansion occurs prior to the swizzle operation, thereby allowing the same swizzle configuration for both operations. In typical operations the same configuration would be used for any given system and thus only one determination of duplication/expansion need be made. However, situations may arise where more than one VRAM system configuration is controlled by the same processor, and thus dynamic control can be required. This can easily be achieved by arranging duplicate/expansion circuit 52 to function under control of the system processor on a case by case basis.

Duplicate/expansion circuit 52 can be any type of register circuit or processor that can reorder and pad numbers. This can be operated by microcode under control of the main processor or by a special processor or can be performed by a host processor if desired. The function performed by circuit 52 is mathematical in nature and thus one skilled in the art can easily devise many arrangements to perform the desired function.

Circuit 52 can be system adaptable to change the duplicating and expansion function on a dynamic basis in response to received data or in response to a flag in a register to allow for changing pixel/memory configurations. Thus, for a pixel size of 16 bits and a VRAM of the same size as shown in FIG. 1, namely four bits, four VRAMS would be used for each pixel and thus the expansion would be by four bits. In this situation, as shown in FIG. 6, expanded word 61 would have the data from compressed bit ordinate position 0 expanded into ordinate positions 0, 1, 2, 3 of the expanded word. In this situation the data from compressed ordinate position 1 would be expanded into ordinate bit positions 4, 5, 6, 7, and so forth.

It can be seen from the chart in FIG. 7 that the duplicated data at the inputs 0, 1, 2, 3 of the swizzle circuit go to outputs 0, 4, 8, 12. From FIG. 4 it can be seen that these outputs go to VRAMS 200,201,202,203 which are the four VRAMS which would hold pixel 0 if that pixel were to be 16 bits long.

The compressed word is provided in a register such that it can be rotated through all 32 bits for any given memory clock cycle regardless of how many bits are expanded. This allows for continuous system operation without regard to pixel size. This also allows for total flexibility of memory storage to allow for starting and stopping at any given pixel boundary.

Figure 8:
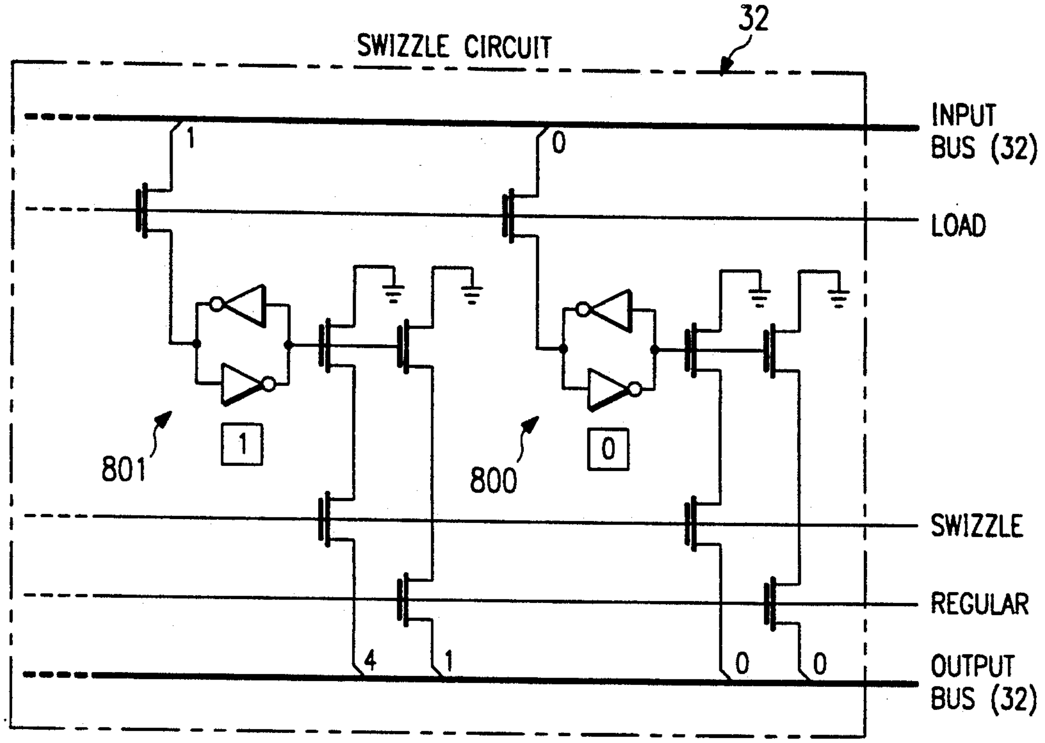
FIG. 8 shows one embodiment of a swizzle circuit.

FIG. 7 shows the input to output correspondence of swizzle circuit 32 when the swizzle circuit is in the swizzle mode. It should be realized that each input has two possible outputs' the swizzle output, as shown, and the straight-through output, which is not shown. Of course, the straight-through output has input 0 connected to output 0, with input 1 connected to output 1, input 2 connected to output 2, and so forth. A switching circuit is used to switch between the straight-through arrangement of the swizzle circuit and the swizzle mode of the swizzle circuit. FIG. 8 shows one embodiment of the swizzle circuit 32 where registers 0 and 1 are shown for positions 0 and 1.

As shown in FIG. 8, the input bus has 32 leads, and the output bus also has 32 leads. Between these leads are a number of latches, two of which, 800 801, are shown. Each latch has a single input connected to an individual input bus lead and two outputs connected to the straight-through correspondence and to the swizzle correspondence in accordance with FIG. 7. The latches load in a straightforward manner from information on the input bus upon the signal provided on the load lead. For the straight-through operation, a signal is provided on the REGULAR lead, and the outputs from the latches are clocked straight through the swizzle circuit with straight-through correspondence, as noted above. However, when swizzle circuit 32 is being utilized in the swizzle mode, the SWIZZLE lead is pulsed, and this serves to switch the outputs. For example, with respect to latch 801, in the straight-through mode, latch 801 is connected to lead 1 of the output bus. However, in the swizzle mode, as can be seen, another output from latch 1 is connected to lead 4 of the output bus. All of the latches of swizzle circuit 32 are wired with this correspondence such that the swizzle output lead of each latch is connected as shown in FIG. 7 to the output bus lead. This arrangement allows for the selective control of swizzle circuit 32 in the straight-through mode or the swizzle mode, under control of the system processor.

The circuit shown in FIG. 8 can be expanded to cover the multiple swizzles required for swizzle circuit 42. In this situation, an extra controlled output lead would extend from each latch to a different output In this mode, a second swizzle control signal would extend to control multiple outputs from each latch. The number of multiples being a function of the number of VRAMs containing the same pixel information.

While the circuit and method shown here has been described in terms of the block-write operation of a graphics processing system it can be used in numerous other situations where ordinate coordination is required for controlling physical adaptations. It should be noted that the circuitry including the swizzle circuit and processor could be integrated into single chip.

While the discussion has referred to the block-write mode as it relates to VRAMs, it should be understood that the same type of memory operations could be added to memories not specifically intended to support video.

Although the present invention has been described with respect to a specific preferred embodiment thereof, various changes and modifications may be suggested by one skilled in the art, and it is intended that the present invention encompass such changes and modifications as fall within the scope of the appended claims.

What is claimed is:

1. A graphics processing system comprising:

a plurality of memories each having a corresponding special register of more than one bit with a block-write mode for storage of data bits via data control leads, said memories addressable in normal mode and in block-write mode, said block-write mode using all or part of the data control leads used in normal mode for data transfer as a compressed data control input which with one bit of the compressed data control inputs used to control transfer or non-transfer of m-bits from said corresponding special register to a set of m-bits specified by the address to each memory;

a reordering circuit for allowing data from a compressed data word to pass from a multi-bit input to certain leads of a multi-bit output bus when data is being presented to said data control leads of said memories in a normal manner and for allowing data to pass from said multi-bit input to certain other leads of said multi-bit output bus when data is being presented to said data control inputs of said memories during a block-write cycle in a block-write mode; and said data control input leads of said memories when in the block-write mode controlling the transfer or non-transfer of said m-bits of said special register based upon whether said output bits of said reordering circuitry are a logical 1 or a logical 0.

2. The graphics processing system of claim 1 wherein said reordering circuit, when used in the block write mode, causes consecutive bits on said input to the reordering circuit to control the writing of sequential pixels from said corresponding special registers to said memories.

3. The graphic system of claim 2 further comprising bus expansion circuitry coupled to said multi-bit input.

4. The graphic processing system of claim 1 wherein said special register bits represent color information.

5. The graphic system of claim 1 wherein said reordering circuitry is a multiplex circuit.

6. The graphic system of claim 1 wherein said reordering circuitry includes a memory having a look-up table for the association of said input to said output bus leads.

7. The graphic system of claim 1 wherein said reordering circuitry includes circuitry for passing data from individual said input to multiple said output bus leads.

8. The graphic system of claim 1 wherein said reordering circuitry, when writing to said memories in a block-write mode, can replicate said input bits n times to said output bus leads of the reordering circuit, wherein said outputs are used to control n memories in unison in order to control the writing of multiple quantities of n×m bits.

9. The graphics system of claim 8 wherein the input bits are replicated twice for controlling the writing of 8 bits to memories where said one bit of said data control inputs controls the writing of 4 bits from said corresponding special register to each said memory when in a block write mode.

10. The graphic system of claim 8 wherein said reordering circuit can support more than one replication of said input bits to said output bus leads.

11. The graphic system of claim 8 further comprising circuitry for expanding said compressed data word by duplicating each said compressed data word data word data bit a number of times equal to the number of memories required to store a single pixel.

12. The graphic system of claim 1 wherein said reordering circuitry is included within a single chip.

13. The graphic system of claim 1 wherein said reordering circuitry is software controlled.

14. The graphic system of claim 1 wherein said writing of said compressed word in said memories occurs within a single memory cycle.

15. The graphic system of claim 1, wherein:

said reordering circuitry includes a first stage replicating individual input bits a number of times equal to the number of memories n required to store a single pixel, and a second stage rearranging the order to said replicated input bits, said rearranged order being the same for any n.

16. A method of controlling memory access in a graphic processing system wherein data bits are stored via data control leads in a plurality of memories during any one memory cycle, said memories addressable in a normal node and in a block-write mode, said block-write mode controlled by data in a compressed data word, said method comprising:

storing pixel data in special registers corresponding to each of said memories, each special register storing m special register bits;

passing data from a multi-bit input to certain leads of a multi-bit output bus when data is being presented to said memories in a normal manner;

reordering data from a compressed data word to pass from said multi-bit input to certain other leads of said output bus when data is being presented to memories in the block-write mode; and transferring or not transferring data from said corresponding special registers to said memories based on said data located in said bits of said output bus in the block-write mode based upon whether said output data bits are a logical 1 or a logical 0.

17. The method of claim 16 wherein the reordering step rearranges data bits of said compressed data word to cause consecutive said data bits of said compressed data word in said input to control said transferring or not transferring of data from said corresponding special registers to sequential pixels in said memories.

18. The method of claim 16 wherein said m special register bits represent color information.

19. The method of claim 16, wherein:

said step of reordering data from said compressed data word includes replicating individual input bits of said compressed data word a number of times equal to the number of memories n required to store a single pixel, and rearranging the order of said replicated bits, said rearranged order being the same for any n.

20. The method of claim 16 wherein said reordering step further includes the step referencing a look-up table to determine the association of said inputs to said output bus bit leads.

21. The method of claim 16 wherein said reordering step includes passing data from said input leads to multiple said output bus leads.

22. The method of claim 16 wherein said reordering step includes replicating each bit of said multi-bit input twice to control the writing of eight bits to memories where said one bit of said compressed data control inputs supports the writing of four bits from said corresponding special register to each said memory.

23. The method of claim 16 wherein said reordering step is controlled by software.

24. The method of claim 16 wherein said passing and storing steps or said reordering step and said storing step occurs within one cycle.

* * * * *